United States Patent
Pyo et al.

(10) Patent No.: US 10,971,716 B2
(45) Date of Patent: Apr. 6, 2021

(54) ELECTRODE UNIT AND METHOD FOR MANUFACTURING THE SAME

(71) Applicant: LG Chem, Ltd., Seoul (KR)

(72) Inventors: Jung Kwan Pyo, Daejeon (KR); Sung Jong Kim, Daejeon (KR); Cha Hun Ku, Daejeon (KR); Tae Kyu Kim, Daejeon (KR); Won Nyeon Kim, Daejeon (KR); Gyung Soo Kang, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/066,538

(22) PCT Filed: Aug. 8, 2017

(86) PCT No.: PCT/KR2017/008575
§ 371 (c)(1),
(2) Date: Jun. 27, 2018

(87) PCT Pub. No.: WO2018/066800
PCT Pub. Date: Apr. 12, 2018

(65) Prior Publication Data
US 2019/0386289 A1   Dec. 19, 2019

(30) Foreign Application Priority Data
Oct. 7, 2016  (KR) .................. 10-2016-0130071

(51) Int. Cl.
*H01M 4/66* (2006.01)
*H01M 4/04* (2006.01)

(52) U.S. Cl.
CPC ....... *H01M 4/0471* (2013.01); *H01M 4/0404* (2013.01); *H01M 4/0435* (2013.01); *H01M 4/661* (2013.01)

(58) Field of Classification Search
CPC ............. H01M 4/0471; H01M 4/0404; H01M 4/0435; H01M 4/661
See application file for complete search history.

(56) References Cited

U.S. PATENT DOCUMENTS

| | | | |
|---|---|---|---|
| 2005/0221192 A1 | 10/2005 | Hennige et al. | |
| 2009/0136832 A1* | 5/2009 | Mitsuda | H01G 11/70 429/94 |

(Continued)

FOREIGN PATENT DOCUMENTS

| | | |
|---|---|---|
| CN | 103988339 A | 8/2014 |
| EP | 2323201 A1 | 5/2011 |

(Continued)

OTHER PUBLICATIONS

Extended European Search Report and Written Opinion for EP Application No. 17858595.6, dated Feb. 15, 2019.

(Continued)

*Primary Examiner* — Jane J Rhee
(74) *Attorney, Agent, or Firm* — Lerner, David, Littenberg, Krumholz & Mentlik, LLP (57) ABSTRACT

Provided are an electrode unit and a method for manufacturing the electrode unit. According to the present invention, after the electrode unit is manufactured by using heat, bending of the electrode unit occurring by cooling the electrode unit may be eliminated or minimized. To achieve the aforementioned object, in the method for manufacturing the electrode unit according to an embodiment of the present invention, stress applied to the inside of each of the positive electrode collector and the negative electrode collector is calculated to reflect the calculated results, thereby selecting the positive electrode collector and the negative electrode collector.

9 Claims, 4 Drawing Sheets

(56) References Cited

U.S. PATENT DOCUMENTS

| | | | |
|---|---|---|---|
| 2010/0196755 A1 | 8/2010 | Park et al. | |
| 2013/0288122 A1 | 10/2013 | Matsushima et al. | |
| 2014/0072851 A1 | 3/2014 | Oh et al. | |
| 2014/0170475 A1 | 6/2014 | Park et al. | |
| 2014/0374248 A1* | 12/2014 | Datz | H01M 8/1004 204/282 |
| 2015/0044535 A1 | 2/2015 | Kobayashi et al. | |
| 2015/0349347 A1* | 12/2015 | Oda | H01M 4/667 429/245 |
| 2017/0222280 A1 | 8/2017 | Asano et al. | |

FOREIGN PATENT DOCUMENTS

| | | |
|---|---|---|
| JP | 2007087814 A | 4/2007 |
| JP | 2013069708 A | 4/2013 |
| JP | 2013191388 A | 9/2013 |
| KR | 20100090068 A | 8/2010 |
| KR | 20160077872 A | 7/2016 |
| WO | 2016051639 A1 | 4/2016 |

OTHER PUBLICATIONS

Search report from International Application No. PCT/KR2017/008575, dated Nov. 20, 2017.
Chinese Search Report for Application No. 2017800063731 dated Jul. 30, 2020, 2 pages.

* cited by examiner

ELECTRODE UNIT AND METHOD FOR MANUFACTURING THE SAME

CROSS-REFERENCE TO RELATED APPLICATION

The present application is a national phase entry under 35 U.S.C. § 371 of International Application No. PCT/KR2017/008575, filed on Aug. 8, 2017, published in Korean, which claims priority from Korean Patent Application No. 10-2016-0130071, filed on Oct. 7, 2016, the disclosures of which are hereby incorporated herein by reference.

TECHNICAL FIELD

The present invention relates to an electrode unit and a method for manufacturing the electrode unit.

BACKGROUND ART

In general, a secondary battery that is repeatedly chargeable and dischargeable includes an electrode assembly. Here, the electrode assembly may be manufactured by combining electrode units.

Figure 1:
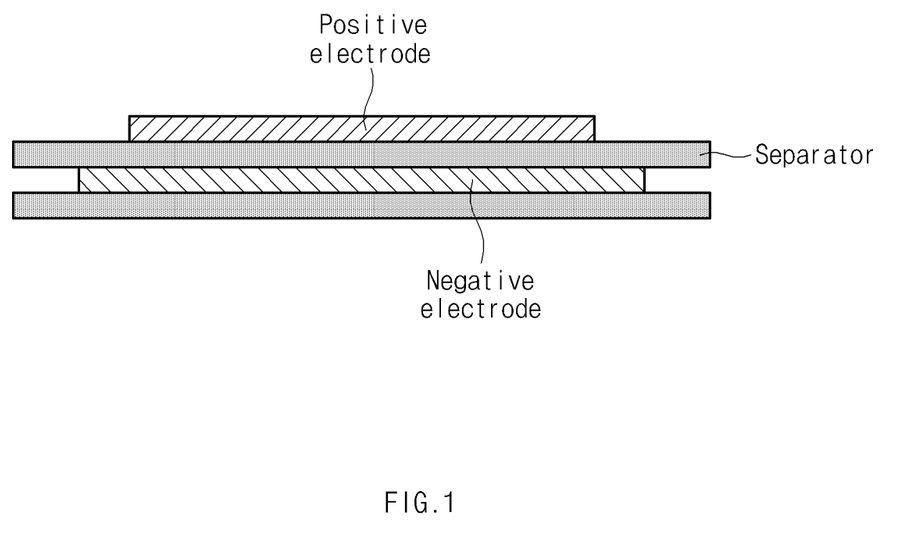
FIG. 1 is a side view illustrating an example of an electrode unit structure according to the related art.

FIG. 1 is a side view illustrating an example of an electrode unit structure according to the related art. As illustrated in FIG. 1, the electrode unit may include a positive electrode, a separator, and a negative electrode. The electrode unit may be formed by alternately stacking the positive electrode, the separator, and the negative electrode. The electrode units are combined with each other to manufacture an electrode assembly. The electrode unit may be manufactured through various manufacturing methods. For example, a process of manufacturing the electrode unit may include a process of applying heat to the positive electrode, the separator, and the negative electrode. Both surfaces or one surface of a collector may be coated with a positive electrode active material to manufacture the positive electrode. Also, both surfaces or one surface of the collector may be coated with a negative electrode active material to manufacture the negative electrode.

Figure 2:
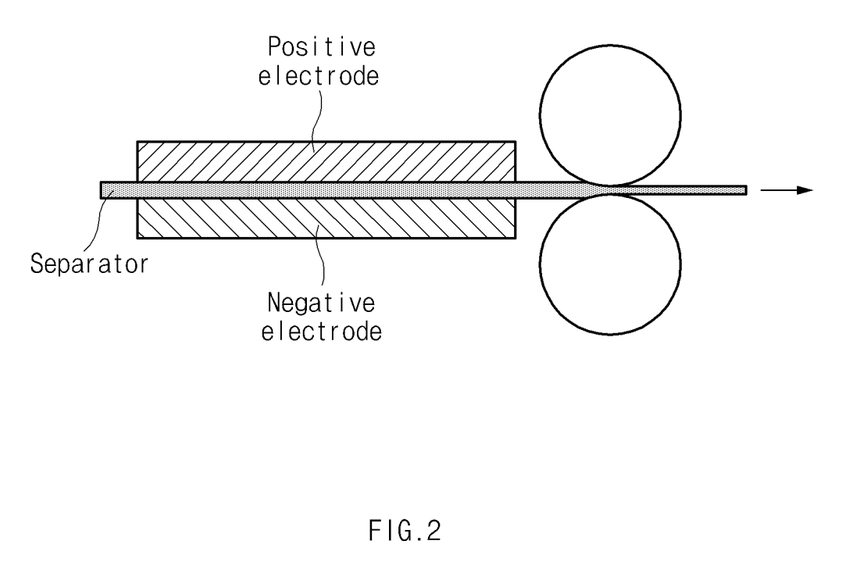
FIG. 2 is a side view illustrating an example of a method for manufacturing the electrode unit according to the related art.

FIG. 2 is a side view illustrating an example of a method for manufacturing the electrode unit according to the related art.

The method for manufacturing the electrode unit, which is illustrated in FIG. 2, may be a lamination process. The lamination process is a process of arranging a separator and an electrode so as to come into contact with or be close to each other, and then heating and/or pressing the separator and the electrode by using equipment such as a roll to bond the separator to the electrode.

DISCLOSURE OF THE INVENTION

Technical Problem

When the electrode unit is manufactured through the heating process such as the lamination process, the complete electrode unit is cooled as a time elapses. Thus, when the electrode unit is manufactured through the heating process, the electrode unit is contracted as a time elapses. However, the electrode unit includes a plurality of materials different from each other. Thus, since the plurality of materials have different thermal expansion coefficients, components of the electrode unit may be contracted at contraction ratios different from each other to cause bending of the electrode unit.

A method of removing the heating process or reducing a degree of heat application may be considered in the process of manufacturing the electrode unit. In this case, however, bonding force between the separator and the electrode and stiffness of the electrode unit may be deteriorated.

Therefore, to solve the above-mentioned problems, an object of the present invention is to prevent the bending of the electrode unit from occurring or minimizing the bending of the electrode unit even through the electrode unit is cooled after the process of manufacturing the electrode unit by applying heat.

Technical Solution

According to a first aspect of the present invention for achieving the abovementioned object, a method for manufacturing an electrode unit including a positive electrode, a negative electrode, and a separator includes: a selection step of selecting a positive electrode collector provided in a positive electrode and a negative electrode collector provided in a negative electrode; a coating step of applying an active material to each of the positive and negative electrode collectors selected in the selection step; and a bonding step of applying heat to bond the positive electrode, the separator, and the negative electrode to each other, wherein, in the selection step, stress applied to the inside of each of the positive electrode collector and the negative electrode collector due to cooling of the electrode unit after the electrode unit is manufactured is calculated to reflect the calculated results, thereby selecting the positive electrode collector and the negative electrode collector.

In the selection step, the stress applied to the inside of each of the positive electrode collector and the negative electrode collector may be calculated according to a thickness of the positive electrode collector or the negative electrode collector to select the positive electrode collector and the negative electrode collector.

In the selection step, the positive electrode collector and the negative electrode collector may be selected so that a ratio of the thickness of the positive electrode collector to the thickness of the negative electrode collector is 1.8 to 3.1.

The positive electrode collector may be made of aluminum, and the negative electrode collector may be made of copper.

The positive electrode, the separator, and the negative electrode may be bonded to each other through a lamination process.

According to a second aspect of the present invention for achieving the abovementioned object, a method for manufacturing an electrode unit including a positive electrode, a negative electrode, and a separator includes: a selection step of selecting a positive electrode collector provided in a positive electrode and a negative electrode collector provided in a negative electrode; a coating step of applying an active material to each of the positive and negative electrode collectors selected in the selection step; and a bonding step of applying heat to bond the positive electrode, the separator, and the negative electrode to each other, wherein, in the selection step, a degree of bending of the electrode unit by contraction of the positive electrode collector and the negative electrode collector due to cooling of the electrode unit after the electrode unit is manufactured is calculated according to a change in thickness of the positive electrode collector or a change in thickness of the negative electrode collector to select the positive electrode collector and the negative electrode collector.

In the selection step, the positive electrode collector and the negative electrode collector may be selected so that a ratio of the thickness of the positive electrode collector to the thickness of the negative electrode collector is 1.8 to 3.1.

The positive electrode collector may be made of aluminum, and the negative electrode collector may be made of copper.

The positive electrode, the separator, and the negative electrode may be bonded to each other through a lamination process.

According to a third aspect of the present invention for achieving the abovementioned object, an electrode unit includes a positive electrode, a negative electrode, and a separator, wherein the positive electrode, the separator, and the negative electrode are bonded to each other, the positive electrode and the negative electrode includes a positive electrode collector and a negative electrode collector, respectively, and a ratio of a thickness of the positive electrode collector to a thickness of the negative electrode collector is 1.8 to 3.1.

The positive electrode collector may be made of aluminum, and the negative electrode collector may be made of copper.

Advantageous Effects

According to the present invention, event though the electrode unit is cooled after the process of manufacturing the electrode unit by applying the heat, the bending of the electrode unit may be prevented or minimized.

MODE FOR CARRYING OUT THE INVENTION

Hereinafter, a method for manufacturing an electrode unit according to an embodiment of the present invention will be described with reference to the accompanying drawings.

As described above, when heat is applied to manufacture the electrode unit, the bending of the electrode unit occurs while the electrode unit is cooled after manufacturing the electrode unit. The bending of the electrode unit is largely affected due to different thermal expansion coefficients between a positive electrode collector and a negative electrode collector, which constitute a positive electrode and a negative electrode.

Figure 3:
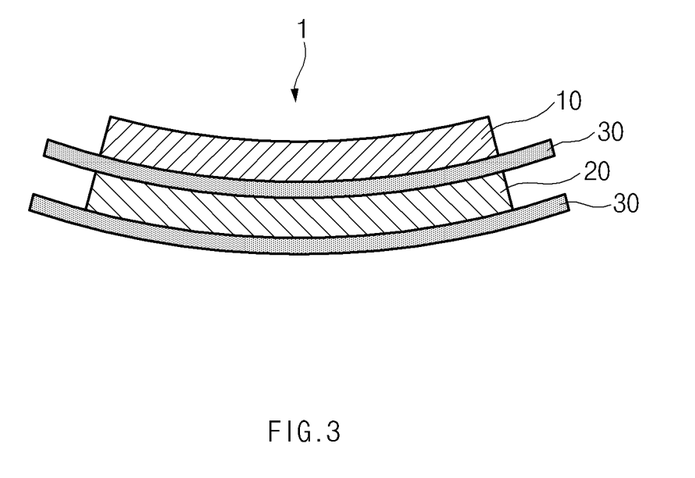
FIG. 3 is a side view illustrating a warped state of an electrode unit due to cooling of the electrode unit after the electrode unit is completely manufactured.

FIG. 3 is a side view illustrating a warped state of an electrode unit due to cooling of the electrode unit after the electrode unit is completely manufactured.

Each of electrodes 10 and 20 of an electrode unit 1 may include an electrode active material (not shown) and an electrode collector (not shown) having one surface or both surfaces coated with the electrode active material. The positive electrode 10 and the negative electrode 20 constituting the electrodes may face each other with a separator 30 therebetween. While the electrode unit is manufactured, heat may be applied to the positive electrode 10 and the negative electrode 20 to bond the positive electrode 10 and the negative electrode 20 to the separator 30. For example, the electrode unit 1 may be manufactured through a lamination process.

The positive electrode collector and the negative electrode collector may be made of materials different from each other. Thus, the positive electrode collector and the negative electrode collector may have physical properties different from each other. Particularly, since the positive electrode collector and the negative electrode collector have thermal expansion coefficients different from each other, the positive electrode collector and the negative electrode collector may have different contraction ratios while being cooled to cause bending of the electrode unit.

For example, the positive electrode collector of the positive electrode 10 may be made of aluminum, and the negative electrode collector of the negative electrode 20 may be made of copper. When based on a linear expansion coefficient, aluminum may have a thermal expansion coefficient of 23.1 $\mu m*m^{-1}*K^{-1}$ (based on 25 degrees Celsius), and copper may have a thermal expansion coefficient of 16.5 $\mu m*m^{-1}*K^{-1}$ (based on 25 degrees Celsius). Hereinafter, although the case in which the positive electrode collector is made of aluminum, and the negative electrode collector is made of copper is described as an example, the present invention is not limited thereto. For example, the present invent may also be applied to a case in which the positive electrode collector or the negative electrode collector is made of a different material.

While the electrode unit 1 is cooled after the electrode unit 1 is manufactured by applying heat, aluminum forming the positive electrode collector may be contracted relatively more than copper forming the negative electrode collector. Thus, as illustrated in FIG. 3, both ends of the electrode unit 1 may be bent toward the aluminum (i.e., the positive electrode collector).

Here, since a degree of bending of aluminum and copper is different from that of entire bending of the electrode unit, stress in aluminum and copper may occur in due to tensile force or contraction force. That is, since a degree of the contraction of aluminum (i.e., the positive electrode collector) is larger than that of the entire contraction of the electrode unit, tensile stress occurs in the aluminum due to tensile force acting from a center to both ends of the aluminum. On the other hand, since a degree of the contraction of copper (i.e., the negative electrode collector) is less than that of the entire contraction of the electrode unit, contraction stress (e.g., compressive stress) occurs in the copper due to contraction force acting toward a center of the copper.

For added clarity, aluminum and copper have different linear expansion coefficients, and thus an amount of thermal deformation of aluminum due to temperature changes is greater than that of thermal deformation of copper. Thus, it may be conceptually understood that copper applies tensile stress to aluminum, and aluminum applies contraction stress to copper.

This is explained by following equations.

Stress (hereinafter, denoted by the character 'σ' in this specification) is defined as resistivity P in a material acting per unit area A of the material. That is, the stress is defined as follows.

$$\sigma = \frac{P}{A}$$

(hereinafter, referred to as '[Equation 1]')

Also, stress may be expressed by the following equation. When the material is deformed within an elastic limit, the stress is expressed as a product of a modulus of elasticity or Young's modulus (hereinafter, denoted by the character 'E' in this specification) and strain (strain of the material per unit length, hereinafter, denoted by the character 'ε' in this specification). That is, the stress is defined as follows.

σ=E×ε (hereinafter, referred to as '[Equation 2]')

Here, when [Equation 2] is summarized for ε, and then [Equation 1] is substituted, the following equation is derived.

$$\varepsilon = \frac{\sigma}{E} = \frac{P}{A \times E}$$

(hereinafter, referred to as '[Equation 3]')

A displacement (hereinafter, denoted by the character 'λ' in this specification) in length of a material is defined as a product of the strain and the length of the material (hereinafter, denoted by the character 'L' in this specification) by definition. Thus, the following equation is derived.

$$\lambda = \varepsilon \times L = \frac{P \times L}{A \times E}$$

(hereinafter, referred to as '[Equation 4]')

A contraction length due to cooling of the positive electrode collector and the negative electrode collector constituting the electrode unit 1 has to consider an influence of contraction due to a temperature change as well as an influence of stress acting on the material.

That is, referring to FIG. 3, an amount of contracted length of aluminum (i.e., the positive electrode collector) is a value obtained by subtracting an amount of length contracted by the tensile stress from an amount of length contracted according to a temperature change, and an amount of contracted length of copper (i.e., the negative electrode collector) is the sum of an amount of length contracted according to the temperature change and an amount of length contracted by the contraction stress. However, since the positive electrode and the negative electrode are bonded to the same separator, it is assumed that the amount of contracted length of aluminum and the amount of contracted length of copper are the same. Thus, when a thermal expansion coefficient of the material based on a linear expansion coefficient is α, and the temperature change is ΔT, the following equation is derived.

$$a_{al} \times \Delta T \times L_{al} - \frac{P \times L_{al}}{A_{al} \times E_{al}} = a_{cu} \times \Delta T \times L_{cu} + \frac{P \times L_{cu}}{A_{cu} \times E_{cu}}$$

(hereinafter, referred to as '[Equation 5]')

Here, when it is assumed that the positive electrode collector and the negative electrode collector have the same length ($L_{al}$=$L_{cu}$), and [Equation 5] is summarized for P, the following equation is derived.

$$P = \frac{(a_{al} - a_{cu}) \times \Delta T}{[1/(A_{al} \times E_{al})] + [1/(A_{cu} \times E_{cu})]}$$

(hereinafter, referred to as '[Equation 6]')

That is, the resistivity P applied to the inside of the electrode unit may be obtained by using [Equation 6], and then, the resistivity P may be substituted into [Equation 1] to obtain $\alpha_{al}$ and $\alpha_{cu}$.

When the positive electrode collector is made of aluminum, and the negative electrode collector is made of copper, both ends of the electrode unit 1 may be bent toward the aluminum. Thus, to reduce a degree of the bending of the electrode unit 1, it is necessary that a displacement $\lambda_{al}$ of aluminum decreases, or a displacement $\lambda_{cu}$ of copper increases. Here, referring to [Equation 2] and [Equation 4], to reduce the displacement $\lambda_{al}$ of aluminum, it is necessary that the stress $\sigma_{al}$ of aluminum decreases. Also, to increase the displacement $\lambda_{cu}$ of copper, it is necessary that the stress $\sigma_{cu}$ increases.

That is, the method for manufacturing the electrode unit, which includes the process of heating the electrode unit, according to an embodiment of the present invention may include a process of calculating stress applied to the inside of each of the positive electrode collector and the negative electrode collector due to the cooling of the positive electrode and the negative electrode to reflect the calculated results and thereby to select the positive electrode collector and the negative electrode collector. That is, the process of selecting the positive electrode collector and the negative electrode collector may include the process of calculating the stress applied to the inside of each of the positive electrode collector and the negative electrode collector to prevent the bending of the electrode unit or minimize the bending of the electrode unit.

As described above, there are various methods for controlling the stress applied to the inside of each of the cooled positive and negative electrode collectors. Among them, the invertors of the present invention have confirmed that the thickness of the positive electrode collector or the negative electrode collector has a great influence on the stress applied to the inside of the positive electrode collector or the negative electrode collector. Table 1 below shows test results obtained by measuring stress of aluminum or copper depending on changes in thickness of aluminum or copper when the positive electrode collector is made of aluminum, and the negative electrode collector is made of copper.

TABLE 1

Test results obtained by measuring stress of aluminum and copper depending on change in thickness of aluminum or copper

| | Thickness of aluminum (μm) | Thickness of copper (μm) | Resistivity applied to the inside of electrode unit (kgf) | Stress applied to the inside of aluminum (kgf/mm$^2$) | Stress applied to the inside of copper (kgf/mm$^2$) |
|---|---|---|---|---|---|
| Reference | 12 | 10 | 1.5 | 1.4 | 1.6 |
| Thickness of copper decreases by 5 μm | 12 | 5 | 1.1 | 1.0 | 2.3 |

TABLE 1-continued

Test results obtained by measuring stress of aluminum and
copper depending on change in thickness of aluminum or copper

| | Thickness of aluminum (μm) | Thickness of copper (μm) | Resistivity applied to the inside of electrode unit (kgf) | Stress applied to the inside of aluminum (kgf/mm²) | Stress applied to the inside of copper (kgf/mm²) |
|---|---|---|---|---|---|
| Thickness of copper increases by 5 μm | 12 | 15 | 1.8 | 1.6 | 1.3 |
| Thickness of aluminum decreases by 5 μm | 7 | 10 | 1.1 | 1.7 | 1.2 |
| Thickness of aluminum increases by 5 μm | 17 | 10 | 1.8 | 1.2 | 2.0 |

As shown in Table above, when the thickness of copper decreases by 5 μm, it is confirmed that the stress of aluminum decreases, and the stress of copper increases to alleviate the bending of the electrode unit. When the thickness of aluminum increases by 5 μm, it is confirmed that the stress of aluminum decreases, and the stress of copper increases to alleviate the bending of the electrode unit.

Particularly, according to the test results, in the case in which the positive electrode collector is made of aluminum, and the negative electrode collector is made of copper, when the thickness of copper decreases by 5 μm, it is confirmed that the stress of the aluminum decreases by 28% from 1.4 kgf/mm² to 1.0 kgf/mm², and the stress of copper increases by 44% from 1.6 kgf/mm² to 2.3 kgf/mm². On the other hand, when the thickness of aluminum increases by 5 μm, it is confirmed that the stress of aluminum decreases by 14% from 1.4 kgf/mm² to 1.2 kgf/mm², and the stress of copper increases by 25% from 1.6 kgf/mm² to 2.0 kgf/mm². That is, the inventor of the present invention have confirmed that, in order to alleviate the bending of the electrode unit, the adjustment of the thickness of copper is more effective than that of the thickness of aluminum so as to decrease the stress of aluminum and increase the stress of copper.

The reason why the adjustment of the thickness of copper is more effective than that of the thickness of aluminum to alleviate the bending of the electrode unit is because Young's modulus of copper is greater about 1.6 times than that of aluminum (Young's modulus of copper is 110 Gpa, and Young's module of aluminum is 69 Gpa), and a bending moment on the plate-like material is proportional to the third square of the thickness.

However, it is impossible to indefinitely decrease the thickness of copper or indefinitely increase the thickness of aluminum so as to alleviate the bending of the electrode unit. This is done because, when the thickness of copper excessively decreases, or the thickness of aluminum excessively increases, both the ends of the electrode unit may be bent toward the copper (i.e., the negative electrode collector). Thus, in order to minimize the bending of the electrode unit, it is confirmed that a ratio of the thickness of aluminum to the thickness of copper is also an important factor.

Figure 4:
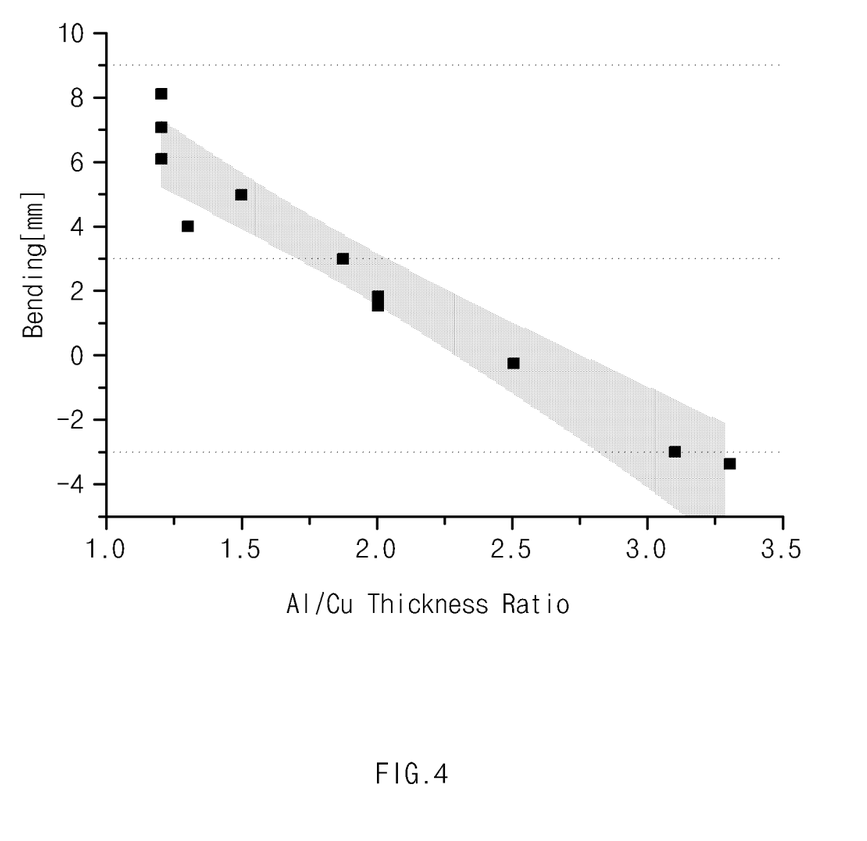
FIG. 4 is a graph illustrating results obtained after testing a degree of bending of an electrode unit depending on a variation in ratio of a thickness of aluminum to a thickness of copper (Al/Cu thickness ratio) according to the present invention.

FIG. 4 is a graph illustrating results obtained after testing a degree of warpage of an electrode unit depending on a variation in ratio of a thickness of aluminum to a thickness of copper (Al/Cu thickness ratio) according to the present invention.

As illustrated in FIG. 4, when a ratio of the thickness of aluminum to the thickness of copper is within a predetermined range, it is confirmed to significantly prevent the electrode unit from being bent. As illustrated in FIG. 4, the inventors of the present invention have experimentally confirmed that a degree of the bending of the electrode unit is significantly reduced when the ratio of the thickness of aluminum to the thickness of copper is 1.8 to 3.1.

Hereinafter, a method for manufacturing an electrode unit according to an embodiment of the present invention will be described with reference to the above-described contents.

A method for manufacturing an electrode unit including a positive electrode, a negative electrode, and a separator according to an embodiment of the present invention may include a selection step of selecting a positive electrode collector provided in a positive electrode and a negative electrode collector provided in a negative electrode; a coating step of applying an active material to each of the positive and negative electrode collectors selected in the selection step; and a bonding step of applying heat to bond the positive electrode, the separator, and the negative electrode to each other. Here, the selection step may include a step of calculating stress applied to the inside of each of the positive electrode collector and the negative electrode collector due to cooling of the positive electrode and the negative electrode to reflect the calculated results and thereby to select the positive electrode collector and the negative electrode collector. As described above, the thickness of the positive electrode collector and the thickness of the negative electrode collector may be adjusted to control the stress applied to the inside of the positive electrode collector and the negative electrode collector.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A method for manufacturing an electrode unit comprising a positive electrode, a negative electrode, and a separator, the method comprising:
   a selection step of selecting a positive electrode collector provided in a positive electrode and a negative electrode collector provided in a negative electrode, the positive electrode collector comprising aluminum and the negative electrode collector comprising copper;
   a coating step of applying an active material to each of the positive and negative electrode collectors selected in the selection step; and
   a bonding step of applying heat to bond the positive electrode, the separator, and the negative electrode to each other,
   wherein, in the selection step, a stress applied to the inside of each of the positive electrode collector and the negative electrode collector due to cooling of the electrode unit after the electrode unit is manufactured is calculated to reflect the calculated results, thereby selecting the positive electrode collector and the negative electrode collector,
   wherein, in the selection step, the positive electrode collector and the negative electrode collector are selected so that a ratio of a thickness of the positive electrode collector to a thickness of the negative electrode collector is 1.8:1 to 3.1:1, and
   wherein, in the selection step, the stress applied to the inside of each of the positive electrode collector and the negative electrode collector is calculated according to the following two equations:

$$\sigma = \frac{P}{A}$$

$$P = \frac{(a_{al} - a_{cu}) \times \Delta T}{[1/(A_{al} \times E_{al})] + [1/(A_{cu} \times E_{cu})]},$$

wherein A is an average of $A_{al}$ and $A_{cu}$.

2. The method of claim 1, wherein, in the selection step, the stress applied to the inside of each of the positive electrode collector and the negative electrode collector is calculated according to the thickness of the positive electrode collector or the negative electrode collector to select the positive electrode collector and the negative electrode collector.

3. The method of claim 1, wherein the positive electrode collector is made of aluminum, and the negative electrode collector is made of copper.

4. The method of claim 1, wherein the positive electrode, the separator, and the negative electrode are bonded to each other through a lamination process.

5. A method for manufacturing an electrode unit comprising a positive electrode, a negative electrode, and a separator, the method comprising:
 a selection step of selecting a positive electrode collector provided in a positive electrode and a negative electrode collector provided in a negative electrode, the positive electrode collector comprising aluminum and the negative electrode collector comprising copper;
 a coating step of applying an active material to each of the positive and negative electrode collectors selected in the selection step; and
 a bonding step of applying heat to bond the positive electrode, the separator, and the negative electrode to each other,
 wherein, in the selection step, a degree of bending of the electrode unit by contraction of the positive electrode collector and the negative electrode collector due to cooling of the electrode unit after the electrode unit is manufactured is calculated according to a change in a thickness of the positive electrode collector or a change in a thickness of the negative electrode collector to select the positive electrode collector and the negative electrode collector,
 wherein, in the selection step, the positive electrode collector and the negative electrode collector are selected so that a ratio of the thickness of the positive electrode collector to the thickness of the negative electrode collector is 1.8:1 to 3.1:1,
 wherein, in the selection step, a stress applied to an inside of each of the positive electrode collector and the negative electrode collector is calculated according to the following two equations:

$$\sigma = \frac{P}{A}$$

$$P = \frac{(a_{al} - a_{cu}) \times \Delta T}{[1/(A_{al} \times E_{al})] + [1/(A_{cu} \times E_{cu})]},$$

wherein A is an average of $A_{al}$ and $A_{cu}$.

6. The method of claim 5, wherein the positive electrode collector is made of aluminum, and the negative electrode collector is made of copper.

7. The method of claim 5, wherein the positive electrode, the separator, and the negative electrode are bonded to each other through a lamination process.

8. An electrode unit comprising a positive electrode, a negative electrode, and a separator,
 wherein the positive electrode, the separator, and the negative electrode are bonded to each other,
 the positive electrode and the negative electrode comprise a positive electrode collector and a negative electrode collector, respectively, the positive electrode collector comprising aluminum and the negative electrode collector comprising copper, and
 a ratio of a thickness of the positive electrode collector to a thickness of the negative electrode collector is 1.8:1 to 3.1:1, the ratio being selected based on a stress applied to an inside of each of the positive electrode collector and the negative electrode collector, the stress being calculated according to the following two equations:

$$\sigma = \frac{P}{A}$$

$$P = \frac{(a_{al} - a_{cu}) \times \Delta T}{[1/(A_{al} \times E_{al})] + [1/(A_{cu} \times E_{cu})]},$$

wherein A is an average of $A_{al}$ and $A_{cu}$.

9. The electrode unit of claim 8, wherein the positive electrode collector is made of aluminum, and the negative electrode collector is made of copper.

* * * * *